United States Patent [19]

Sherman et al.

[11] Patent Number: 5,110,226

[45] Date of Patent: May 5, 1992

[54] BATTERY OPERATED DATA ENTRY TERMINAL DEVICE AND PRINTER ATTACHMENT

[75] Inventors: Richard A. Sherman, Toddville; Darald R. Schultz, Cedar Rapids, both of Iowa

[73] Assignee: Norand Corporation, Cedar Rapids, Iowa

[21] Appl. No.: 600,552

[22] Filed: Oct. 19, 1990

[51] Int. Cl.$^5$ ............................................... B41J 3/36
[52] U.S. Cl. .................................. 400/88; 346/76 PH; 320/39; 320/47; 400/120; 364/707; 364/708
[58] Field of Search ......................... 400/82, 88, 120; 101/93.04; 346/76 PH; 364/707, 708; 320/39, 40, 29, 38, 47; 323/303

[56] References Cited

U.S. PATENT DOCUMENTS

| | | | |
|---|---|---|---|
| 4,168,533 | 9/1979 | Schwartz | 400/88 |
| 4,623,418 | 11/1986 | Gombrich et al. | 400/88 |
| 4,706,096 | 11/1987 | Sato | 101/93.04 |
| 4,716,354 | 12/1987 | Hacker | 320/39 |
| 4,734,710 | 3/1988 | Sato | 101/93.04 |
| 4,846,924 | 7/1989 | Morrison | 400/88 |
| 4,871,269 | 10/1989 | Murata | 400/88 |
| 4,931,950 | 6/1990 | Isle et al. | 364/188 |
| 4,962,430 | 10/1990 | Hiroki et al. | 400/88 |
| 4,980,009 | 12/1990 | Goodwin et al. | 101/93.04 |

FOREIGN PATENT DOCUMENTS 0215573  8/1989  Japan ..................................... 400/88

*Primary Examiner*—Eugene H. Eickholt
*Attorney, Agent, or Firm*—McAndrews, Held & Malloy, Ltd.

[57] ABSTRACT

A portable printing data entry terminal device includes a portable data entry terminal unit which has a display and keyboard for manual entry of data and control instructions. The data entry terminal unit is powered by a rechargeable battery pack which is housed within the terminal unit. A printer unit is mounted to one end of the data entry terminal unit. The printer unit has its own battery pack to power the printing function. An electrical and data interface between the terminal and printer units routes data to the printer unit for information to be printed. The interface also routes communication and power lines through the printer unit to external connectors disposed at one end of the printer unit. The printer power, though contained within the printer unit, is controlled by the data entry terminal unit to be selectively turned off. Controlling the printer power to be turned on only when information is to be printed tends to equalize the discharge cycle of the terminal and printer batteries.

22 Claims, 3 Drawing Sheets

BATTERY OPERATED DATA ENTRY TERMINAL DEVICE AND PRINTER ATTACHMENT

BACKGROUND OF THE INVENTION

1. Field of the Invention

The invention relates generally portable data entry terminal devices and particularly to portable printing data entry terminal devices.

2. Discussion of the Prior Art

The prior art shows printers, such a thermal printers for printing bar code labels, which are combined with data terminal units. For example, thermal label printers are known which include components, such as a label printer in combination with a data terminal. These units may be coupled together to be used as a hand-held unit, or they may be used as table units, in which they may be physically connected only by cables. In other instances, the data terminal units and the printing units appear as unitary structures. Data terminal units may include a keyboard and a display on an upper face of a housing. A data terminal unit as a portable unit would also include a self-contained power source, such as a rechargeable battery, further including a power input plug to recharge the battery. A bar code reader device is also known as being connectable to such data terminal device. Thus according to the art the desirability of a portable device for entering data and then printing information, including bar codes, has been shown. However, at this time, improvements aimed at reducing weight, simplifying the operation of a printing data entry terminal device and also further increasing the versatility of such a printing data entry terminal device remain desirable.

SUMMARY OF THE INVENTION

1. Objects and Summary

The present invention in the art of data entry terminal devices addresses problems relating to ruggedness, compactness and life between battery charges. A particular feature of the invention is its applicability to a data entry terminal device which has input or output contacts at both a top or a bottom end of its housing. It is contemplated to provide a printer unit which may be matched to and become attached to a data entry terminal device having electrical input or output contacts at both a top and a bottom end of an elongated housing of a hand-held data entry terminal device.

It is an object of the invention to provide an improved data entry terminal device which is capable of printing based on information provided by the data entry terminal device, and which maintains the capability to be coupled to external data and power communication devices.

It is a further object of the invention to modify an existing data entry terminal with a printer attachment without impairing the duty cycle of the data entry terminal device.

It is yet another object of the invention to provide a data terminal with a printer attachment without impairing the portability of the combination of the printer attachment and the data entry terminal device.

It is a further object of the invention to attach a printer unit to an opening in a housing of a data entry terminal unit and to seal the opening against environmental influence.

It is another object of the invention to attach the printer unit at an end of a data entry terminal unit in a manner which provides a rigid and sturdy attachment base wider than the width of the opening.

In accordance with an aspect of the invention, a portable, printing data entry terminal device may be provided with a printer unit which may include at least one external connector for electrical data or poW(®)r communication with the data entry terminal. According to another aspect of the invention, the printer unit may include a self-contained power supply, such as a rechargeable battery.

The power to the printer may be selectively disabled by a battery disrupt switch operated from the data entry terminal device. When the printer is not in use, such a disablement of the printer power extends the battery charge cycle of the printer battery. Such an extended battery charge cycle tends to equalize a cycle life between charges of the self-contained power source for the printer to that of the data entry terminal with the same type battery as that in the data entry terminal.

According to another aspect of the invention, a housing wall end of the printer housing which terminates against an end cap opening of the data entry terminal is shaped to fit against a seal about the opening of the data entry terminal. The printer housing includes divider walls which may extend from respective upper and lower printer housing shells, and which are spaced from the housing wall end to provide a chamber adjacent the end cap, the walls of the chamber having the function of substantially sealing the opening from water or other environmental hazards which may otherwise enter through the opening into the housing of the data entry terminal device. Precision spacing which may be provided between the respective upper and lower divider walls forms predetermined openings for routing a power, control and communication cable therethrough between the printer unit and the data entry terminal unit.

2. Discussion of Related Developments

Certain ones of the features of the invention have been found applicable to improve portable data entry terminal devices by providing printing capability thereto. The invention is consequently described below with respect to a particular, preferred embodiment in which a portable printing data entry terminal includes the combination of a printer unit and a portable data entry terminal unit. The portable data entry terminal unit features a housing that is preferably protected against contamination from harmful elements which may be present in the intended working environment of the apparatus improved by the invention. In one embodiment, the invention hereof may be an improvement of a non-printing data entry terminal designed for versatility in data handling capability. The data entry terminal may include data input and output and power terminals which may be disposed at one or both ends of an elongated housing. It appears desirable to provide an integrated printer capability, in which the printer becomes disposed, at least for hand-held data entry operations, at an end and preferably an upper end of the terminal. Such an addition of a printer unit is seemingly frustrated when other data input or output terminals tend to interfere. A copending U.S. Pat. application of Keith K. Cargin, Jr. et al., Ser. No. 07/364,594, filed Jun. 7, 1989, relates to a Hand-Held Computer Terminal which shows in at least one embodiment electrical input and output terminals for data or power at both ends.

Another problem is that of protection from the elements which typically appears neglected by prior art terminals. Advances are needed to protect the data entry terminal from contamination such as water or dust. Lack of protection from such contamination may result in an operational failure when the data entry terminals are operated in delivery route operations or in some merchandising operations which include outdoors or dusty indoor operations. The above-identified application by Cargin et al. discloses measures which may be desirable in protecting a data entry terminal from dust or moisture. The problem when addressed with respect to improving a data entry terminal by a printer, other than in which each is and remains a separate unit, needs to be addressed.

In industrial applications in which a portable or handheld printing data entry terminal may be desirable, besides the ruggedness desired to resist environmental contamination and rough handling, endurance over a full work cycle without need to recharge is a further desirable characteristic. Portable devices which are currently known and commercially available in the art include rechargeable batteries. When the battery charge reaches a point at which data contained in the data terminal unit may become lost because of low power, the unit needs to be returned for charging, hence the unit would need to be exchanged for a fully charged unit. Since compactness and a minimum weight for the desired functions are typically desired characteristics, batteries may be chosen to aptly fit the power consumption without much excess power for a normal work cycle. The invention hereof contemplates, as will become apparent from the detailed description below, to provide printing capability for a portable data entry terminal device, while maintaining the duty cycle between charges.

BRIEF DESCRIPTION OF THE DRAWINGS

The detailed description of a preferred embodiment embodying the various features of the invention may be best understood when read in reference to the accompanying drawings wherein:

FIG. 3 is an enlarged side view of the printer unit showing the relative location of certain functional standard printer components relative to the side elevation of the housing, and showing further an extension of a lower housing shell of the printer housing.

DETAILED DESCRIPTION OF THE INVENTION

Figure 1:
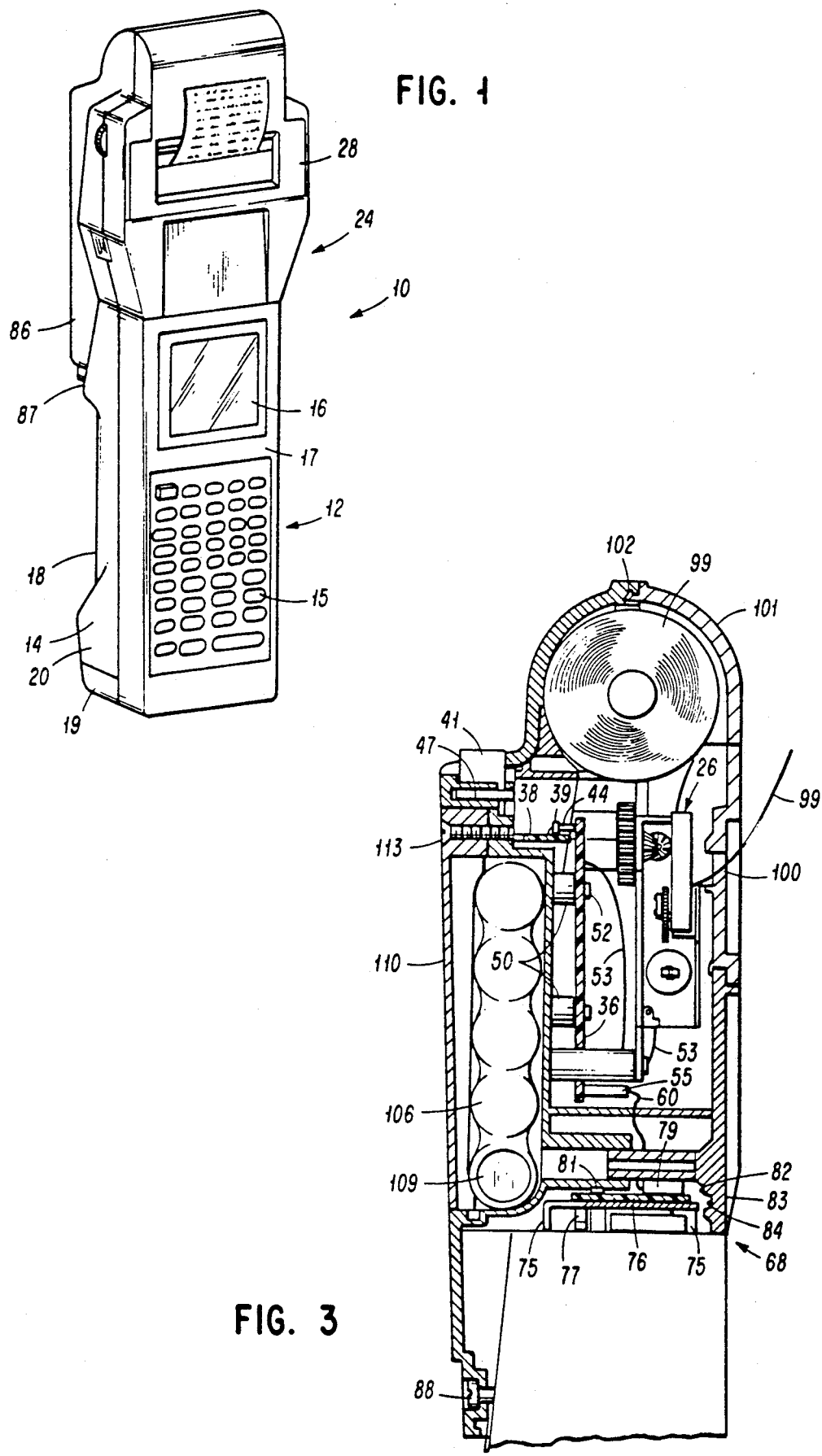
FIG. 1 shows a somewhat simplified pictorial view of a data entry terminal unit and a printer unit attached to the data entry terminal unit and showing features of the present invention.

Referring now to FIG. 1, there is shown a portable, printing data entry terminal device designated generally by the numeral 10, which is described as a preferred embodiment of the present invention. The device 10 is substantially comprised of a non-printing data entry terminal unit 12, which preferably may be a commercial unit known as a NORAND 4000 type terminal. preferred data entry terminal unit 12 includes typically an elongated housing 14 having a keyboard 15 and a display 16, such as a multi-line liquid crystal display. The keyboard 15 and display 16 are shown in an upper face 17 of the data entry terminal unit 12, and a contoured grip portion is shown in its lower face 18. A lower end cap 19 provides access to a battery compartment 20 which may hold a rechargeable battery, such as a NiCad battery, as a self-contained power source 122 for the data entry terminal unit 12.

Figure 2:
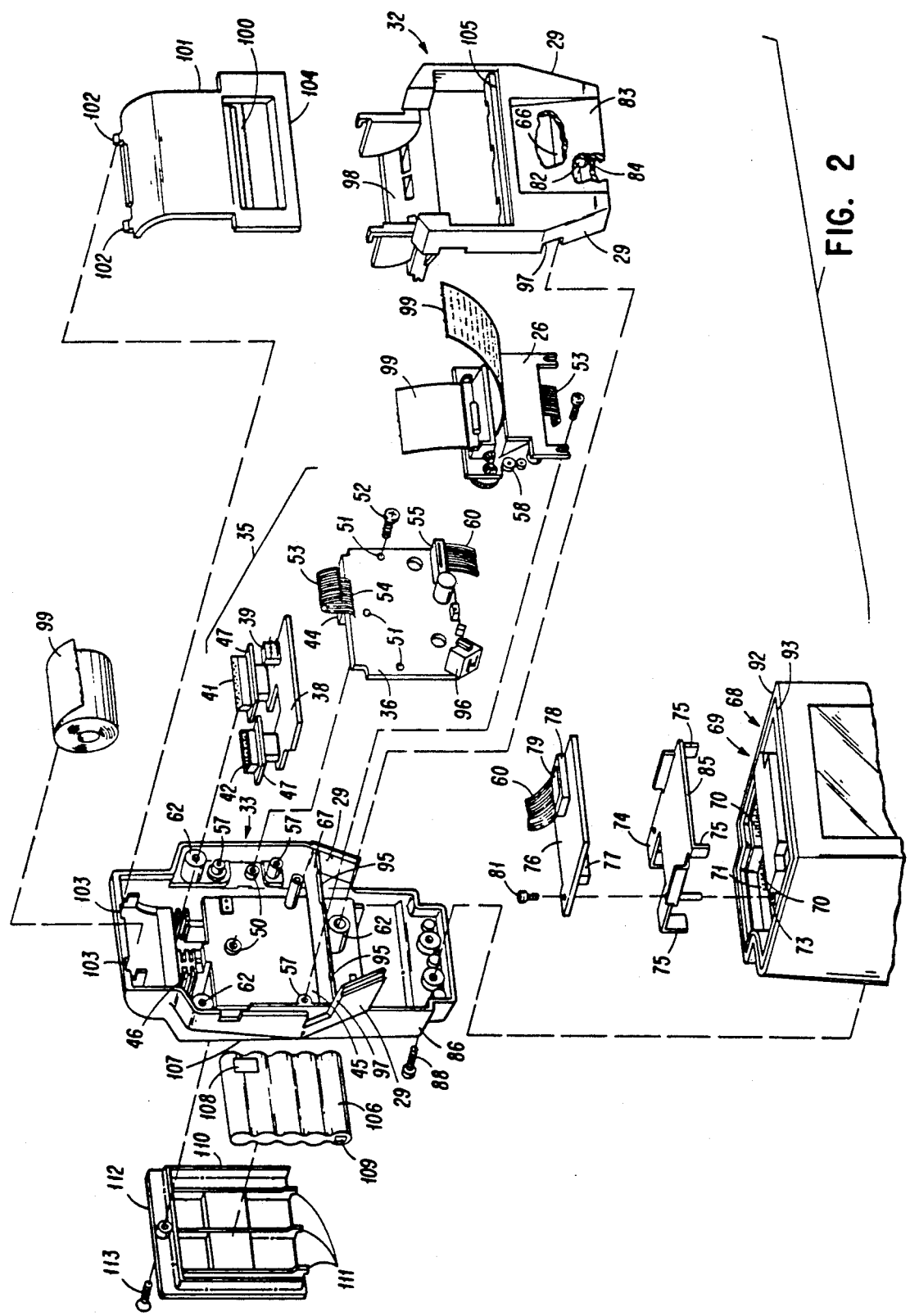
FIG. 2 is an exploded view of an upper end of the data entry terminal unit and the printer unit of FIG. 1, showing in greater detail particular features of the invention.

In reference to FIGS. 1 and 2, a printer unit 24 is attached to a top end 25 of the data entry terminal unit 12. A printer mechanism 26 of the printer unit 24 is preferably a standard EPSON printer module which is commercially available. The width of the printer mechanism 26 necessitates a lateral expansion of a printer housing 28 with respect to the preferred width of the housing 14 of the already existing data entry terminal unit 12. Sloping walls 29 of a transitional portion 30 of the printer housing 28 accommodate the change in width of the printer housing 28.

The printer housing 28 shows in the exploded view of FIG. 2 an upper printer housing shell 32 which fits as a cover over a lower printer housing shell 33. The lower housing shell 33 functions as an assembly base for a main printer circuit board assembly 35 and the printer mechanism 26. The main printer circuit board assembly 35 preferably includes a printer circuit board 36, a circuit component which is manufactured by EPSON as a controller for the commercially available printer mechanism 26 and a connector board 38, a stand-off board which is physically disposed and mounted to extend at a right angle from the printer circuit board 36. The stand-off type connector board 38 is electrically coupled via standard pin connectors 39 to the printer circuit board 36. The connector board 38 includes at least one connector, or, may include two connectors 41 and 42, as shown in FIG. 2. The connectors 41 and 42 may be standard D-Sub type connectors, a 15-pin connector being the preferred connector 42 for RS-232 communication links, a standard 9-pin connector of that type being typical for supporting data entry functions via bar code readers, for example.

Referring particularly to FIG. 2, the assembly of the printer unit 24 proceeds with the assembly of the connector board 38 to the printer circuit board 36. One or two pin connectors 39 (one of which is shown) on the connector board 38 may be coupled to respective sockets 44 on the printer circuit board 36. The resulting main printer circuit board assembly 35 is pushed into a printer cavity 45 of the lower printer housing shell 33. Guide slots or insertion slots 46 engage flanges 47 on the respective connectors 41 and 42. The insertion slots restrain the lateral movement of the connectors 41 and 42 and determine their position with respect to respective openings in the lower housing shell 33. The circuit assembly 35 becomes located and is mounted to standoffs or bosses 50 (two of which are shown) located in the printer cavity 45. Mounting holes 51 line up with the bosses 50 to admit typical fasteners, such as threaded fasteners 52. The printer mechanism is electrically coupled to the circuit assembly 35 via data and power cable 53 from the printer circuit board 36. The cable 53 may be soldered to the board 36 at 54, or may be coupled via a typical pin connector, such as a connector 55. Such a connector 55 (not shown at the printer mechanism 26) may be used to couple the cable 53 to the printer mechanism 26. Apertures 56 in the printer circuit board 36 allow two of three mounting bosses 57 to protrude through the circuit board for mounting the printer mechanism 26 via mounting holes 58 directly above the circuit board 36 in a compact arrangement. A typical pin type connector 55 also couples the printer unit 24 electrically and communicatively via a data and control cable 60 to the data entry terminal unit 12.

The upper housing shell 32 may preferably be attached to the lower housing shell 33 by means of standard threaded connector screws (not shown). The screws are preferably inserted for cosmetic reasons from an underside of the lower housing shell 33 through mounting bosses 62 and fastened into blind mounting holes (not shown) in the upper housing shell 32. As the upper housing shell 32 is drawn tight against the lower housing shell 33, an upper end wall 64 of the upper housing shell 32 bears against the D-Sub connectors 41 and 42 to positively lock them against upward displacement out of the insertion slots 46.

Another feature of the assembled upper and lower housing shells 32 and 33 stems from the joining of the sloping side walls 29 and divider walls 66 and 67 extending between the sloping side walls 29 in each of the respective shells 32 and 33 and extend toward each other when the two housing shells 32 and 33 become assembled to each other. The divider walls 66 and 67 form, together with the assembled side walls 29, a sealing end cap at an upper end 68 of the data entry terminal unit 12. FIG. 2 shows the data entry terminal unit 12 without a typical end cap, thus leaving an opening 69 at the upper end 68 of the elongated housing 14 of the data entry terminal unit 12. The typical end cap which would normally seal off the upper end of the data entry terminal unit 12 and serve to mount typical D-Sub type communication connectors has been removed to attach the printer unit 14 to the top end 68. The open end 68 shows two groups of stake type connector pins 70 extending from an electrical and data interface 71 which is disposed adjacent the opening 69 and within the housing 14 of the data entry terminal unit 12. Such a standard end cap would become attached to the housing 14 with screws fast ®n ®d into threaded bosses 73 of the housing 14.

In providing for an efficient and secure mounting of the printer unit 24 to the data entry terminal unit 12, an adapter bracket 74 is attached to the threaded bosses 73. As a preferred embodiment, the adapter bracket may be of metal, such as formed steel or the like. Formed legs 75 bear against ledges within the housing 14 when the adapter bracket is attached to the housing. An electrical connector board 76 is a typical circuit board with electrical leads formed and coupled between two connector sockets 77, only one of which is shown, and a cable connector 78, which may be a typical ZIF (zero insertion force) connector for the cable 60 which preferably is a typical flat cable. The connector 78 is mounted to the connector board 76. The cable 60 may be inserted into an insertion slot of the connector 78 and an upper latching plate 79 may be clamped against the inserted cable 60 to lock it in place. When mounting screws 81 (Only one being shown) are fastened down, the connector board 76 becomes fastened to the adapter bracket 74 and the adapter bracket becomes attached to the data entry terminal unit 12 within the opening 69. Fastening the adapter bracket 74 and connector board 76, also causes the connector sockets 77 to become inserted over the two groups of interface pins 70.

The upper housing shell 32 further includes formed into an inner surface 82 of an upper wall 83 a mounting groove 84. The mounting groove 84 receives a retainer ledge 85 of the adapter bracket 74 to lock the housing securely over the retainer ledge 85 when the printer unit 24 is positioned at the upper end 68 of the data entry terminal unit 12. It has been found that a more secure mounting of the printer unit 24 may be achieved when a corresponding second attachment point becomes farther removed from the mounting groove 84. A secure mounting is being achieved by an extension 86 of the lower housing shell 33 which extends along the lower face 18 of the housing 14 of the data entry terminal unit 12 to an attachment point 87 at which a hand strap (not shown) may typically be fastened. Threaded fasteners 88 may be used to fasten the extension 86 to the lower face or underside of the housing 14 at such a point, removed from the retainer ledge by a considerable distance. It has been found that such an offset attachment of the printer unit 24 to the data entry terminal unit 12 provides an acceptably secure attachment for the printer unit. When the printer unit 24 is attached to the data entry terminal unit 12 in the manner described, lower edges 91 of the sloped walls 29 bear against a peripheral edge 92 about the opening 69 in the housing 14. As a preferred embodiment, a resilient seal, such as an O-ring 93 may be attached or embedded in a recess about the peripheral edge 92. In this manner, the walls 29 in combination with the divider walls 66 and 67 provide an end cap across the opening 68 to substantially close off the opening 68 from environmental hazards such as water or dust. An inner edge of at least one of the divider walls 66 or 67 may be modified from a straight sealing edge to include at least one recess 95 adapted for routing a cable, such as the flat cable 60 between the two mating edges of the divider walls 66 and 67. The size of the recess 95 is preferably chosen such that the cross section of the cable routed through the recess 95 fills the recess and functions as a seal of the void formed by the recess 95. In this manner the integrity of the sealing surface is preserved. The cable 60 preferably includes an excess length which may be collapsed within the space provided between the adapter bracket 74 and the divider walls 66 and 67. The excess length allows the cable 60 to electrically couple the printer unit 24 to the respective data entry terminal unit 12 while the two units 12 and 24 are still physically separated. During the attachment of the printer 24 to the terminal unit 12 the cable 60 may then be stowed as described. A second recess 95 may be shaped to accept a communication cable for a modem. The main circuit board 36 further shows, for example, a mounted communication socket 96 to which an external communication device, such as a modem (not shown) may be connected. When the main circuit board 36 is assembled into the printer cavity as previously described, the socket 96 becomes aligned with a matching opening 97 in the sloping walls 29. Significantly, the opening 97 is located in that portion of the walls 29 which is disposed in the printer cavity 45 and not in the part forming the end cap for sealing off the housing 14.

When the upper housing shell 32 is assembled to the lower housing shell 33, an uppermost cavity 98 in the printer housing 28 will accept a roll of printer paper 99, which may be single or multiple ply paper or may be a roll of backing with adhesively mounted labels, such as for bar code label printing. The paper 99, after being routed through the printer mechanism 26 would exit through a slot 100 disposed in a printer cover 101. The printer cover 101 is placed and locked over the printer housing 28 after the paper 99 has been inserted into the printer. Hooks 102 at one end of the printer cover 101 preferably engage corresponding recesses 103 at an uppermost end of the lower housing shell 33 and an opposite end 104 of the printer cover 101 may be snapped into a recess 105 in the upper housing shell 32.

Further in reference to FIG. 2 and in reference to FIG. 3, there is shown a rechargeable battery 106, such as a NiCad battery, which is insertible into a lowermost battery cavity 107 of the lower housing shell 33 to provide the printer unit 24 with a self-contained power source. It has been found that the power requirements for the printer unit 24 may shorten the period between charges of a self-contained power source for the data entry terminal unit 12 in such a manner that the portable printing data entry terminal device 10 as an entirety may not be suitable for extended usage. Consequently, the battery is provided as a self-contained power source for the printer unit 24. The battery is polarized, having, for example, offset terminals 108 and 109, which would prevent an accidental reversal of the battery with possibly resulting damage to electrical circuits of the printer unit 24. When the battery 106 is inserted into the cavity 107, a battery door 110 is applied to confine and retain the battery 106 within the cavity. A preferred manner of fastening the door 110 may be by hooking lower extensions 111 behind a lower edge of an opening to the cavity and fastening the opposite end 112 of the door 110 with a threaded fastener 113.

FIG. 3 more particularly shows the location of the assembled printer mechanism 26, the main circuit board 36, and the described battery 106 in the battery cavity 107 below the circuit board 36. The simplified and partially schematic side elevation of the printer unit 24 also shows the previously described mounting groove 84 and the offset attachment point 87 at the end of the extension 86 of the lower housing shell 33 whereby the attachment of the printer unit 24 to the data entry terminal unit is strengthened. Battery terminals 108 and 109 are internally coupled to the main circuit board 36 to power the printer mechanism and as further described with respect to the schematic of FIG. 4.

Figure 4:
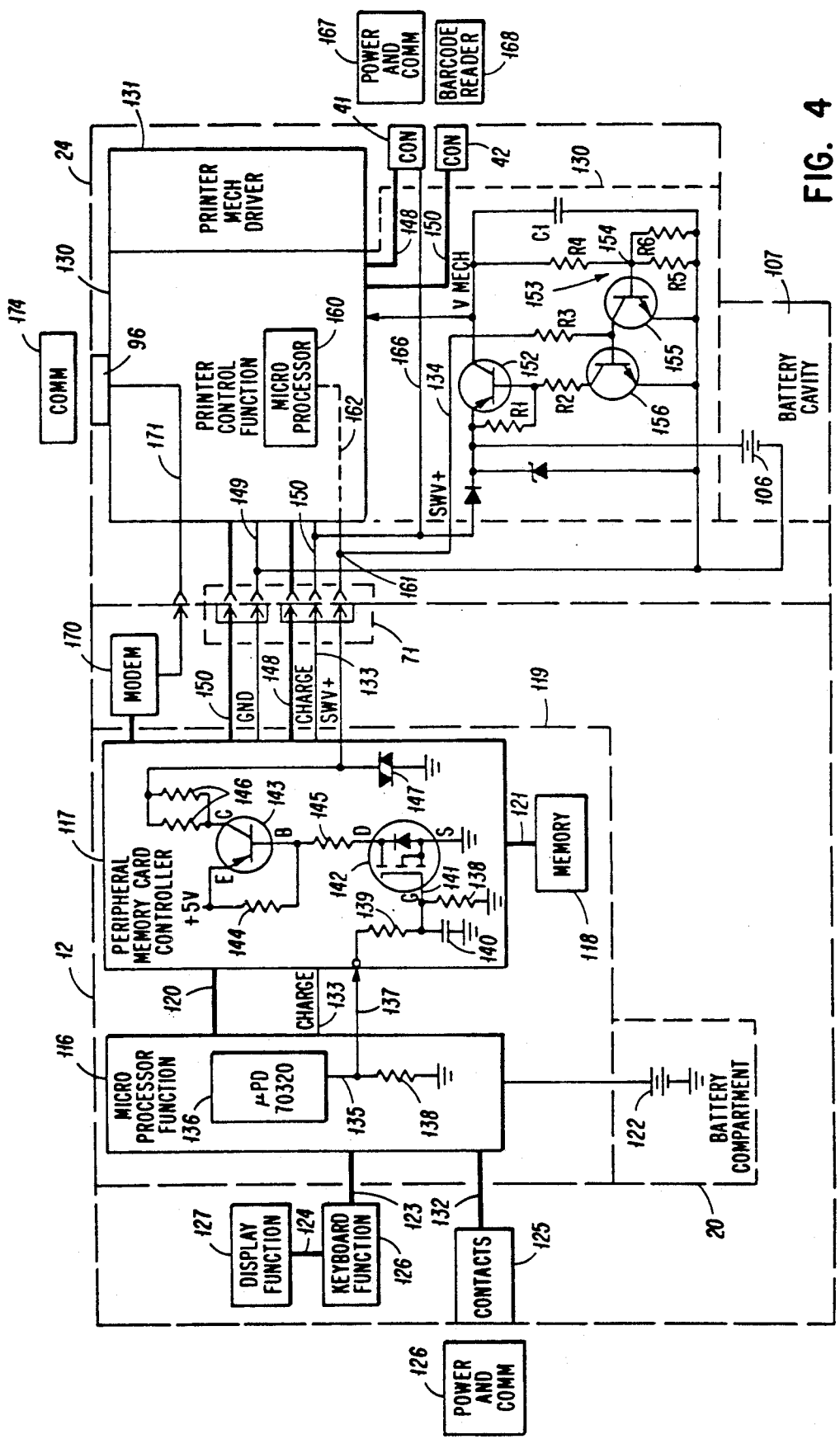
FIG. 4 is a schematic and functional diagram showing particular control and communication functions of the portable, printing data entry terminal device.

Reference is made to FIG. 4 with respect to the following description of functional elements and interactions between the already described physical elements of the data entry terminal device 10. The data entry terminal device includes the data entry terminal unit 12 and the printer unit 24 both of which are shown in the diagram by the respective boxes in phantom lines and identified by 12 and 24, respectively. Functionally, the data entry terminal unit 12 comprises a microprocessor function 116 and a peripheral memory card controller function 117. The microprocessor function may be implemented in a preferred example, for example with a typical commercially available microprocessor, such as an NEC uPD 70320 device. The peripheral memory card controller 117 may include operational program storage, such as may be implemented by read only memory ROM or by random access memory RAM and standard communication circuit devices. The memory card controller function is coupled to respective memory boards identified in the diagram as the corresponding memory function block 118. The memory function may be implemented in the preferred embodiment by commercially available memory extension cards of random access memory or RAM. The memory function 118 may include, for example, eight million bytes or eight megabyte of RAM. While each of the functions 116, 117 and 118 are shown as separate functions, the respective circuits interact via multiple power and data lines. In a compact package of electrical circuits, as desirable for hand-held devices such as the data entry terminal unit 12, one or more typical pin connectors may couple power and data lines which electrically and communicatively link the respective functions into what may be referred to as a control and data processing unit 119. For example, a power and data link or bus 120 is shown as linking the microprocessor function 116 and the peripheral memory card controller 117. The link 120 may include in a physical embodiment typical data lines for 8-bit parallel data communication and respective control lines, RS-232 standard communication lines (such communication lines typically are referred to as Receive Data, Transmit Data, Ready to Send, Clear to Send, Data Terminal Ready and Data Set Ready.) The link 120 may further include control function lines between the microprocessor function 116 and the peripheral memory card controller 117 for controlling direct memory access, in that it may be desired to read from or write data into memory at 118 other than from the microprocessor. Such control functions might typically include memory turn on, memory bus enable, direct memory access request and acknowledge, and direct memory read and write. Typical power interchange would include a common ground line, and a common power line (such as a 5 volt supply line). The referred to functions are combined in the link 120, which is identified schematically in FIG. 4 as a power and data link 120 by typical bold line representation of a bus. A similar data and power link 121 couples memory 118 with its respective controller 117. The link may be established via a typical 40-pin connector or a 40-contact ribbon connector. Besides typical parallel data lines for 8-bit data communication, address lines, memory control lines and standard power lines, the link 121 may inClude an analog line for monitoring, for example, an on-board battery which may be present to provide back-up power for maintaining the memory function 118 should power to the control and data processing unit 119 be interrupted.

The control and data processing unit 119 may typically be powered by a self-contained power source 122, which may be, for example, a NiCad or other type rechargeable battery, preferably a nominally six (6) volt power supply. The battery 122 is coupled to the control and data processing unit and typically provides primary power for the operation of the data entry terminal unit 12. Power and data signals are shown as being routed via a power and data links 123 and 124 through the keyboard to the display as indicated by the respective links to the keyboard function 126 and display function 127. Inasmuch as the keyboard function is an electrically passive switch, the functional route through the keyboard function 126 illustrates a preferred simultaneous data display and entry function in response to manually keyed-in data. Data flow in the links 123 and 124 is bi-directional, in that commercially available liquid crystal display (LCD) units include circuitry not only for writing to the display but also for allowing currently displayed data to be read and verified.

The data entry terminal unit 12 may include in one implementation a plurality of spaced contact pads at a lower end thereof. The contact pads are represented in FIG. 4 by a schematic connector representation of a contact block 128. The connections from the contact block 128 are preferably coupled directly to the control and data processing unit 119. The power terminals of the contact block 128 may be routed through a charge control circuit and ultimately be coupled to the internal power supply lines of the data entry terminal unit 12, hence to the battery 122. An external communication carrier and power supply 129 may consequently be coupled to the contact block 128 to provide data communication with an externally located station (not shown) and power to the unit 12 from such external station.

The printer unit 24 includes a printer control function 130 which is physically part of the printer main circuit board 36. The mechanical printer function is represented by the PRINTER MECH DRIVER 131. The printer function is preferably implemented by a commercially available standard printer unit, such as one which is manufactured by EPSON. However, it is to be understood, that the invention is not limited to any particular type or make of printer, and either dot matrix type impact printers as well as thermal type printers may be used to implement the desired function. The preferred rechargeable battery 106 of the printer unit 24 is shown in the box 107 representing the battery cavity 107. The battery 106 is shown as being coupled to the printer control function 130 to power both the printer control function and the printer driver 131. A data and power link 132 from the contact block 128 may include in addition to typical RS-232 and RS-485 standard communication lines the referred to external power supply line which may preferably be routed to the described electrical and data interface 71 between the data entry terminal unit 12 and the printer unit 24. The power supply line is identified at the electrical and data interface by a separate "CHARGE" line 133.

In accordance with the preferred embodiment, a further circuit function relates to power management of power supplied to implement the printer control 130 and printer driver 131. The particular function is a selective disable function by which the power from the printer battery 106 to the printer mechanism 26, hence to the printer driver function 131, may be selectively turned on or turned off, as needed. The advantage of such a function is an extension of the discharge cycle for the battery 106, allowing the discharge cycle under normal operation of the printer unit 24 to be more equal to the discharge cycle of the battery 122 of the data entry terminal unit 12.

The selective disable function may be implemented in one of a number of ways including by a mechanical switch operated manually by an operator and user of the data entry terminal device 10. In a preferred mode, the selective disable function is implemented via a switched power signal line 134. Functionally the line 134 is also identified in FIG. 4 by the designation "SWV+". The signal preferably originates from a switched voltage port 135 of the microprocessor 136 associated with the microprocessor function 116. The port 135 provides a switched logic signal Which is shown as being routed via a signal lead 137 to the controller function 117. As part of the function of the controller 117 and physically preferred on a respective circuit board of the controller 117, a preferred circuit for converting the logic signal to a power signal is described. If the microprocessor function 116 and the controller function 117 are physically disposed on separate circuit boards, each of the boards may include a resistor 138 coupling the signal lead 137 to ground to ensure that a positive voltage signal may be quickly switched to ground to implement the disable function. A preferred value for the resistor 138 may be a 200 K ohm, 0.125 watt, 1% resistor. Noise protection may be provided, such as by a series resistor 139 and a capacitor 140 coupled to ground. Preferred values may be 475 ohm, 0.125 watt, 1% tolerance for the resistor 139 and 1000 pf, 50 volts for the capacitor 140. The noise protection is supplied at a gate 141 of an N-channel field effect transistor (FET) 142. The transistor 142 is the initial switch which isolates the logic signal from the power signal in converting the logical signal from the microprocessor 136 to the power signal. The switched signal from the transistor 142 is further amplified by switching a p-n-p transistor 143 into conductance. The gate of the transistor 143 is coupled through the drain-to-source switch of the transistor 142 to ground. A five volt source is provided to the base of the transistor 143 through a typical pull-down resistor 144, preferably a 10 K ohm resistor, to ensure proper switching. Base current through the transistor is limited by a 1 K ohm resistor 145. The transistor 143 provides a switched 5 volt power signal which is current limited through a preferred resistance network of two 17.4 ohm, 0.125 watt, resistors 146 which are coupled in parallel. A typical surge protector 147 protects against positive or negative going overvoltages beyond a preferred 12 volt limit with respect to ground (GND). The control signal (SWV+) is then applied via the interface 71 to the printer control 130 of the printer unit 24. It should be understood that the described switch is but one example which may be employed for converting the logical signal into a power signal contemplates a switching signal with limited power drain on the battery 122. Depending on implementation of other peripheral devices, modifications may be made to the described switch. Also, other switching arrangements may be implemented for providing power to control battery usage of the battery 106 of the printer unit 24.

The electrical and data interface 71 couple a data and control links 148 representing RS-232 standard signal and control lines. In addition, and shown separately, ground (GND) and the switched VOltage (SWV+) lines, 149 and 134 respectively, are coupled between the data entry terminal unit 12 and the printer unit 24. Common ground connections between the two units allow the switched voltage signal (SWV+) to execute control signals within the printer unit 24 lo and peripherals as herein contemplated. A data and control link 150 may couple a further external data input via the connector 42 through the printer control 130 and the interface 71 to the control and data processing unit 119.

The printer control 130 includes a voltage regulator circuit 151 including a power switch 152, a typical voltage sensing circuit 153 comprised of a voltage divider 154 and a transistor 155. The transistor 155 varies in its conductance according to the voltage (VMECH) sensed and varies the saturation of a control transistor 156 which in turn controls the conductance of the power switch 152. The power switch 152 may be rendered non-conductive, hence may be turned off selectively by the control signal SWV+ going to ground. When SWV+ turns off the control transistor 156, the base voltage of the power switch 152 goes to V+, the voltage of the battery 106, and the power switch for VMECH, the power voltage for the printer driver 131, is turned off. In the depicted application of the described function, the switch 152 may be a typical p-n-p transistor, R1 a pull down resistor, typically 1 K ohms, R2 being a base current limiting resistor, typically 75 ohms. The control switch and voltage control may be implemented as shown with the primary control n-p-n transistor 156 being coupled between the base of the switch 152 and ground. The switched voltage signal (SWV+) is applied to the base of the transistor 156 through R3, typically 330 ohm. The base current of the control transistor 156 is further modulated by the n-p-n transistor 155 which couples the base of the transistor 156 to ground when fully turned on. The conductance of the transistor 155 is controlled be the voltage divider type resistor network comprised of R4, typically 1.2 K ohms, coupled between the switched output line of VMECH and the base node 154 of the transistor 155, and the parallel network of R5, typically 220 ohms and R6, typically 1.2 K ohms, coupled between the node 154 and ground. A filtering capacitor C1, typically 470 microfarads, is preferred between the switched voltage VMECH and ground. The above describes a representative control network. It should be understood that other type control networks and other methods of switching the printer driver voltage VMECH by means of the control signal originated from the data entry terminal unit 12 without departing from the scope of the invention.

In one embodiment of the invention, the power signal VMECH may be applied to both the printer control function 130 and from there to the printer driver 131. In such an arrangement the printer battery 106 provides the power for both the printer logic and control function and the mechanical printer driver function. In an embodiment in which a voltage control requirement for the mechanical printer driver is less stringent than for the printer control function 130 itself, the printer control function being controlled by a microprocessor 160, for example, it may be preferred to divide the control signal SWV+, such as at 161, and apply the control signal via 162 to a port of the microprocessor 160 as well as to the voltage regulator circuit 151. In this latter embodiment, the VMECH signal would merely be routed via the printer control 130 and hence the printer main circuit board 36 to the driver function 131 of the printer mechanism 26 as shown in FIG. 2.

The main circuit board 36 or its functional equivalent, the printer control 130 in FIG. 4, also serves as a mere conduit to route data communication and power conductors 148, 150 between the interface 71 and external conductor terminals (CON) of connectors 41, 42 as already described with respect to FIG. 2. The D-Sub connector 41, a fifteen pin connector is intended to provide a standard RS-232 interface. Power terminals configured in the connector 41 may also couple external power to the printer unit 24. In addition it may be desirable to route the control signal to a pin termination on the connector 41. External power conductor 166 may be coupled to the CHARGE line 133 to allow both the battery 122 of the data entry terminal unit 12 and the battery 106 of the printer unit 24 to be charged. Hence an external power source and communication carrier 167 may be coupled to the printing data entry terminal 10 via the connector 41. A bar code reader 168, which may be a laser scanner or other type of data reader, may be coupled to the connector 42. A signal input through the connector 42 would likewise merely be routed via link 150 through the printer control 130 and the interface 71 directly to the control and data processing unit 119. The link 150 may include power for the reader 168, and in implementing means to preserve power as with the printer unit 24, it may be desirable to provide switched power by routing the SWV+ function through the link 150 to the connector 42.

A modem 170, which may be housed in the data entry terminal unit may have a special, outgoing communication line 171, typically a two-wire telephone type line, which remains isolated from other circuit connectors and is coupled directly into the modem connector socket 96. The connector socket 96 may then be coupled to a respective communications carrier 174 as shown in FIG. 4.

Various changes and modifications in the structure of the described embodiment are possible without departing from the spirit and scope of the invention as set forth in the claims.

What is claimed is:

1. A portable, printing data entry terminal device comprising:

a data entry terminal unit including an elongate housing having upper and lower faces, a keyboard and a data display disposed in the upper face, a control and data processing unit disposed within said housing and coupled to said keyboard and data display, a self-contained power source disposed within the housing and coupled to the control and data processing unit, and an electrical and data interface disposed within and at one end of the housing, the electrical and data interface coupled to the control and data processing unit, the housing having an opening adjacent said interface and including means for attaching an end cap and connector assembly to the housing for sealing the opening and coupling said connector assembly to said interface;

an adapter bracket attached to the end cap attaching means, the adapter bracket including a support frame, and electrical connector means supported on the frame and electrically coupled to said electrical and data interface for electrical and data signal communication with the control and data processing unit; and a printer unit including a printer housing having upper and lower housing shells, a printer circuit means disposed within the printer housing and adjacent the lower shell, a printer mechanism disposed in the housing adjacent and coupled to the printer circuit means, the printer circuit means including connector means, disposed adjacent an end of said lower housing shell and including at least one connector protruding from said lower housing shell and coupled to said printer circuit means, for providing an external connector termination for said printer circuit means, and means for coupling the printer circuit means to the electrical connector means of the adapter bracket.

2. A printing data entry terminal device according to claim 1, wherein the printer unit comprises a self-contained power source coupled to the printer circuit means for supplying power to the printer circuit means and the printer mechanism.

3. A printing data entry terminal device according to claim 1, wherein the lower shell of the printer housing forms a cavity for receiving a battery, the lower shell further comprising a movable cover, means for securing said cover across the cavity, and contact means for coupling a battery inserted into the cavity to the printer circuit means.

4. A printing data entry terminal device according to claim 1, wherein the printer unit comprises a self-contained power source and means for coupling the power source of the printer unit to the printer circuit means for supplying power to the printer mechanism, and wherein the control and data entry terminal unit includes means for disabling the means for coupling the power source.

5. A printing data entry terminal device according to claim 4, wherein said self-contained power sources of the data entry terminal unit and the printer unit are rechargeable batteries, and wherein said at least one connector of the connector means of the printer circuit means comprises power terminals, said power terminals being coupled to said rechargeable batteries of the data entry unit and the printer unit, whereby an external power source including a battery charger may be coupled to said power terminals to provide external power to said printing data entry terminal device and to charge said batteries.

6. A printing data entry terminal device according to claim 5, wherein said at least one connector of the connector means of the printer circuit means comprises a first connector, said first connector comprising said power terminals and a plurality of additional connector terminals for coupling signal connections of a data communications line through said first connector and to said control and data processing unit of said data entry terminal unit.

7. A printing data entry terminal device according to claim 6, wherein said at least one connector of the connector means of the printer circuit means comprises a second connector, said second connector having a pin-out configuration for an optical scanner, said second connector being coupled through said interface to said control and data processing unit.

8. A printing data entry terminal device according to claim 1, wherein the printer circuit means including the connector means comprises a main printed circuit board disposed generally along said lower housing shell of said printer housing and the connector means comprises an adapter board mounted perpendicularly to said main printed circuit board at one end thereof, and said at least one connector being mounted to the adapter board and extending therefrom toward and through said lower housing shell.

9. A printing data entry terminal device according to claim 8, wherein said main printed circuit board is mounted to standoffs extending from said lower housing shell and said at least one connector includes electrical insertion couplings having insertion axes extending in the plane of said main printed circuit board toward and through an end of said lower shell of said printer housing, said lower shell further including vertical insertion slots adjacent said end of said lower shell, said at least one connector further including a flange disposed perpendicularly to said insertion axes, said flange being disposed within and restrained from lateral movement by the vertical insertion slots.

10. A printing data entry terminal device according to claim 9, wherein said upper housing shell of said printer housing includes a retainer ridge extending generally perpendicularly to said upper and lower housing shells toward said at least one connector, said retainer ridge restricting vertical movement of said at least one connector to retain said at least one connector in said insertion slots.

11. A printing data entry terminal device according to claim 1, wherein the opening in the housing of the data entry terminal unit extends across an end of said data entry terminal unit, the end walls bounding said opening including a seal, and said upper and lower housing shells of said printer housing include corresponding mating wall segments, said wall segments defining a complementary closed wall edge of the printer housing for engaging the end walls bounding said opening within said housing of said data entry terminal unit.

12. A printing data entry terminal device according to claim 11, wherein the upper and lower printer housing shells comprise mating divider walls extending from the upper and lower housing shells toward and into substantially sealing contact with each other, said divider walls being disposed spaced from and adjacent said closed wall edge of the printer housing, said divider walls forming with such closed wall an end cap closing and substantially sealing said opening in the housing of the data entry terminal unit.

13. A printing data entry terminal device according to claim 12, wherein the support frame of the adapter bracket comprises a retainer ledge disposed along said opening adjacent the upper face of data entry terminal unit housing, wherein said upper housing shell has a mounting groove disposed to engage said retainer ledge of the adapter bracket, such engagement positioning said printer unit adjacent said data entry terminal unit, and wherein the lower housing shell includes an extension, said extension being disposed along the lower face of the housing of the data entry terminal unit, and further including means for fastening an outer end of the extension to said lower face, whereby the printer unit is secured against the data entry terminal unit.

14. A printing data entry terminal device according to claim 12, wherein said divider walls comprise a recess adjacent at least one mating edge thereof for routing a cable through the divider walls, the cable occupying said recess and maintaining a substantial seal established by the divider walls across said opening.

15. A portable printing data entry terminal device comprising:
a data entry terminal unit including a keyboard and a display disposed in an upper face thereof, a control and data processing unit including a microprocessor coupled to the keyboard and display, and a self-contained terminal power source coupled to the control and data processing unit for supplying power to the data entry terminal unit;
a printer unit attached to the data entry terminal unit, the printer unit including a printer mechanism and a self-contained printer power source coupled to the printer mechanism for supplying power to the printer mechanism; and
control means coupled to the data entry terminal unit for selectively disabling the printer power source from supplying power to the printer mechanism, said control means including a signal originating from the microprocessor of the control and data processing unit.

16. A printing data entry terminal device according to claim 15, wherein the data entry terminal unit comprises a terminal housing, the control and data processing unit and the self-contained terminal power source being disposed within the terminal housing, the upper face of the data entry terminal being an upper face of the housing, and wherein the printer comprises a printer housing and a printer circuit means, the printer mechanism, the printer circuit means and the printer power source being disposed within the printer housing, the printer housing being attached to the terminal housing, the printing data entry terminal device further comprising an electrical interface having electrical connection means coupled to the control and data processing unit for communicating electrical power, control and data signals between the control and data processing unit and the printer circuit means.

17. A printing data entry terminal device according to claim 16, wherein the printer circuit means comprises a printer control circuit and a regulator circuit for regulating the voltage of electrical power applied to the printer mechanism, and the control means for selectively disabling the printer power source from supplying power to the printer mechanism comprises a control signal for applying power to the printer control circuit and to the regulator circuit as an enable signal to enable the regulator circuit to supply power to the printer mechanism, the control means further comprising a switch disposed in the data entry terminal unit for selectively disabling the control signal for applying power to the printer control circuit and to the regulator circuit.

18. A printing data entry terminal device according to claim 16, wherein the printer circuit means comprises a printer control circuit and a regulator circuit for regulating the voltage of electrical power applied to the printer mechanism, the regulator circuit also being coupled to the printer control circuit for supplying power to the printer control circuit, and the control means for selectively disabling the printer power source from supplying power to the printer mechanism comprises a control signal for applying power to the regulator circuit as an enable signal to enable the regulator circuit to supply power to the printer mechanism, the control means further comprising a switch disposed in the data entry terminal unit for selectively disabling the control signal for applying power to the regulator circuit.

19. A portable printing data entry terminal device comprising:
a data entry terminal unit including a keyboard and a display disposed in an upper face thereof, a control and data processing unit coupled to the keyboard and display, and a self contained terminal power source coupled to the control and data processing unit for supplying power to the data entry terminal unit;
a printer unit attached to the data entry terminal unit, the printer unit including a printer mechanism and a self-contained printer power source coupled to the printer mechanism for supplying power to the printer mechanism;
control means coupled to the data entry terminal unit for selectively disabling the printer power source from supplying power to the printer mechanism;
wherein the data entry terminal unit comprises a terminal housing, the control and data processing unit and the self-contained terminal power source being disposed within the terminal housing, the upper face of the data entry terminal being an upper face of the housing;
wherein the printer comprises a printer housing and a printer circuit means, the printer mechanism, the printer circuit means and the printer power source being disposed within the printer housing, he printer housing being attached to the terminal housing, the printing data entry terminal device further comprising an electrical interface having electrical connection means coupled to the control and data processing unit for communicating electrical power, control and data signals between the control and data processing unit and the printer circuit means; and
wherein the housing of the data entry terminal unit is an elongate housing, the printer housing being attached to the terminal housing at one end thereof, the other end of the terminal housing including a electrical contact means including power contacts and communication signal contacts coupled to the control and data processing unit for supplying power to the data entry terminal unit and the printer unit and for communicating data signals between the data entry terminal device and an external signal carrier.

20. A printing data entry terminal device according to claim 19, wherein the printer circuit means further comprises connector means extending through the printer housing, said connector means including power contacts and communication signal contacts, such contacts of the connector means upon being coupled respectively to an external power source and to a communication signal carrier being able to supply external power to the data entry terminal unit and the printer unit and to communicate by means of such external signal carrier.

21. A printing data entry terminal device according to claim 20, wherein the self-contained power sources of the data entry terminal and printer units are rechargeable batteries and such external power source upon being coupled to supply power to the data entry terminal and printer units also being coupled to recharge the respective rechargeable batteries of the data entry terminal and printer units.

22. A printing data entry terminal device according to claim 16, further comprising a modem, the modem electrically and communicatively coupled to the control and data processing unit, the printer circuit means further comprising a modem connector means coupled to the modem, the modem connector means extending through the printer housing and having a socket for receiving a data signal line for data communication with the control and data processing unit.

* * * * *